3,005,411
Patented Oct. 24, 1961

3,005,411
AUTOMATIC REMOTE CONTROL APPARATUS
Weldon L. Metz, Churchill, Pa., assignor to Westinghouse Electric Corporation, East Pittsburgh, Pa., a corporation of Pennsylvania
Filed Nov. 29, 1957, Ser. No. 699,655
7 Claims. (Cl. 103—11)

This invention relates to a computer and to an automatic remote control apparatus of which it forms a part, and it has reference in particular to a system in which a centralized computer automatically operates a supervisory control apparatus to control remote devices.

An object of the invention is to automatically vary the liquid input to a remote tank having a variable rate of liquid output to tend to maintain the liquid level in the tank in a predetermined steady state.

It is a further object of this invention to maintain close tolerances of the variable water level of a tank utilizing a minimum number of operations of a plurality of liquid level control pumps.

Another object of this invention is to provide a computer which correlates the liquid level in a tank and the rate of liquid flow out of the tank to determine which of plural liquid input pumps should be operated to tend to maintain the liquid level in a predetermined steady state as the level and rate of flow vary.

It is a further object of this invention to provide an automatic remote control apparatus which continuously monitors the variable liquid level and variable rate of liquid output of a remote tank, selects in accordance with changes in said variables a different pump or pumps having different pumping capacities to be operated to compensate for the prevailing rate of liquid output to maintain the liquid level in a predetermined steady state, and automatically operates the selected pumping means.

It is another object of this invention to provide a control apparatus that determines which of a plurality of pumps should be operated to control the liquid level in a tank and then compares such determinations with indications of the actual status of operation of the various pumps whereafter the pumps are caused to change their status of operation only when corresponding determinations and indications disagree.

It is a further object of this invention to provide an automatic control apparatus for changing the operating status of each one of a plurality of pumps from one of a stopped or started condition to the other wherein a computer determines a change in status for one or more of the pumps and actuates the control apparatus to change the status in accordance with the determinations but prevents the control apparatus from performing start operations until the stop operations have been performed.

It is a further object of this invention to provide for correlating indications of the liquid level and rate of liquid output of a tank to determine which one or ones of a plural pump means should be actuated to control the liquid level, and wherein the determinations actuate the operation of the pump, and wherein the actuating means is prevented from operating the pumps until the rate of flow is constant to thus prevent unnecessary operation of the pumps.

It is a further object of this invention to provide for correlating indications of the changing quantity of a fluid and the changing rate of fluid output from a container to selectively indicate proposed changes in the rate of fluid input to the container to tend to maintain a predetermined quantity of fluid in the container.

Other objects will be apparent and still other objects will be explained hereinafter.

According to one of the embodiments of this invention, a remotely located surge tank is connected to each of four pumps of different pumping capacity so that as the rate of output of the tank changes in accordance with the demand for water from the tank, the pumps may be operated individually or in a variety of different combinations to provide a variable liquid input which opposes or counteracts the liquid flow output in such fashion as to tend to maintain a predetermined quantity of water in the tank.

To this end there is provided at the tank a telemetering transmitting means which constantly measures the liquid level and the rate of liquid output of the tank. It is seen that measurements of liquid level also constitute measurements of the quantity of water in the tank since the volume of the surge tank is constant. At the master control station, a liquid level telemetering receiving means directs the telemetered information to a group of ten level indicator relays which represent increments of level and which are progressively energized as the liquid level drops to thus indicate the status of the water level in the tank. Also at the master control station a rate of flow telemetering receiving means directs the telemetering rate of flow information to a group of eight rate of flow indicating relays which represent increments of rate of flow and which are progressively energized as the rate of flow increases to thus indicate the status of rate of liquid flow.

These indicating relays form a part of a computer which determines which of the pumps should be operated to maintain the liquid level in a steady predetermined condition. Under conditions of small variations in rate of flow which tend to change the liquid level from a normal condition, the flow relays energize and deenergize a balance pump selector relay which indicates either one or the other of two preselected pumps of different pumping capacity to be operated to counteract the prevailing rate of liquid flow out of the tank. When the flow varies to the extent that the balancing pumps cannot sustain the normal liquid level in the tank, the level indicating relays indicate a deviation from normal and thus actuate a flow control relay which operates to condition the computer for selecting other or additional pumps for operation in accordance with the new rate of flow.

Thereafter, the rate of flow relays select any one of six pump combination relays for indicating a particular combination of pumps to be operated to provide a proper rate of liquid input for maintaining the liquid level in a predetermined steady state. In the event the water level reaches extreme deviations from normal, the appropriate level indicator actuates either a step-up relay or a step-down relay depending upon the direction of the extreme of the deviation. A group of calibration relays in turn change the calibration of the computer system so that the extremes of flow rate indicators will energize pump combination relays different from those that would be energized by them at more normal liquid levels so that an increased or decreased pumping rate may be obtained depending on whether the level is extremely low or extremely high, respectively. The selected pump combination relay energizes either a start indicator relay or a stop indicator relay for each one of the four pumps, which indications cumulatively provide an indication of the particular pump combination necessary to be operated to maintain the liquid level for the particular conditions of level and flow then existing.

A supervisory control apparatus which can start or stop each of the four pumps is positioned at the master control station and includes a status of operation indicator relay for each of the four pumps, and which relays are energized only when the pumps which they respectively monitor are in an operating condition. The stop indicator relays and the start indicator relays are compared with the supervisory control indicator relays to energize either one or both of a stop disagreement relay and a start disagreement relay, thus indicating that a change in operating status for a pump or pumps is necessary to meet the new operating conditions for the pump, as indicated by the stop and start indicator relays.

The stop and start disagreement relays cooperate with the stop and start relays and with the selected pump combination relay through an actuator system to operate the start and stop control relays of the supervisory control apparatus to cause the pumps to be operated in the manner indicated by the stop and start indicator relays of the computer.

When a change in flow rate is merely transient, a timing motor is prevented from timing out and thus prevents the supervisory control apparatus from performing its pump control operations. When a steady state condition prevails, the timing motor times out to close a master control switch relay and the control of the pumps proceeds in the manner discussed above. The master control switch relay locks itself in and simultaneously prevents a change in selection of pump combination relays even though the prevailing flow condition may change during operation of the supervisory control apparatus.

For a more complete understanding of the nature and scope of the invention, reference may be had to the following detailed description which may be read in connection with the accompanying drawings, in which.

Figure 3:
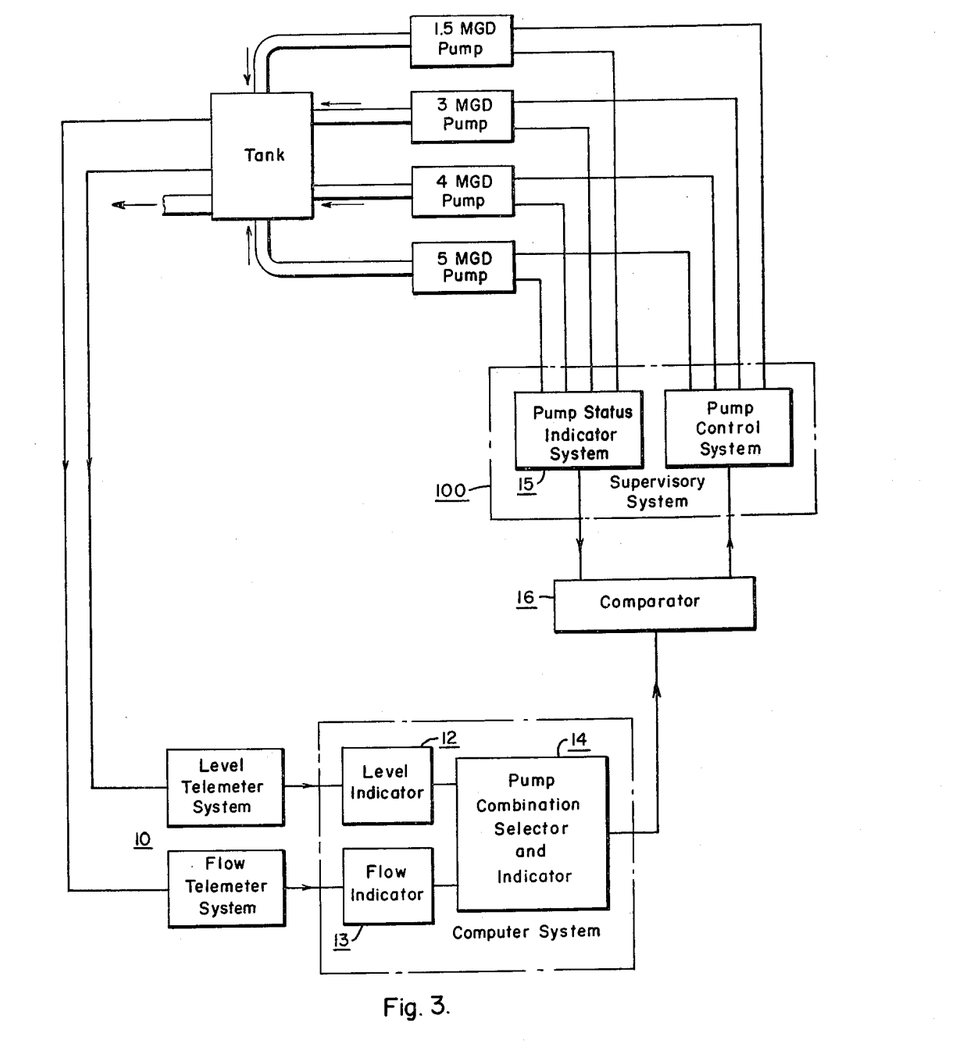
FIG. 3 is a schematic box diagram of the entire automatic control system of FIGS. 1A through 1C showing the functional relationships among the automatic control system, the tank, and the associated pumps.

Referring to the drawing, it will be seen that in FIG. 3 each of four pumps of different pumping capacity are individually connected to a surge tank to provide a variable pumping rate as required. A telemetering system 10, comprised of independent level and flow telemetering systems, is connected to supply telemetered information to a level indicator system 12 and a flow indicator system 13, respectively, in the computer system. The level and flow indicators are then correlated by a pump combination selector system 14 to select and indicate which of the pumps should be started and which should be stopped to provide the appropriate pumping capacity for the prevailing conditions of level and flow. These indications are fed to a comparator system 16 where they are compared with the indications of the actual status of operation of the individual pumps as provided by the pump status of operation indicator system 15, which indicator system is a part of the supervisory system 100 connected to control the individual pumps. The comparator is connected to the pump control system of the supervisory control system 100 to cause the control system to change the status of the individual pumps in those instances where the operating condition of the pump disagrees with the proposed operation requested by the computer.

Referring now to the detailed drawings, it will be seen that a telemetering system 10 (FIG. 1A) is comprised of two independent telemetering transmitting receiver pairs. One pair is comprised of liquid level transmitter TR1 connected to a signal channel 11 which leads to liquid level receiver R1. The other pair is comprised of a rate of liquid flow transmitter TR2 connected to a signal channel 11' which is connected to a rate of liquid flow receiver R2. The transmitters are positioned at a remote station to monitor the water level and the rate of water flow from a tank which is also located in the remote station. The respective receivers R1 and R2 are of a type which indicates a particular liquid level or particular rate of flow condition, respectively, by progressively energizing a plurality of points representing incremental deviations. In this apparatus, the incremental energization in receiver R1 actuates the coils of a group of level indication relays 1L through 10L in a level indicator system 12 (FIG. 1A), each relay representing an increment of liquid level and each relay being attached to the receiver R1 in a group for progressive energization. The coils are attached for energization as the liquid level decreases from the highest level represented by relay 1L to the lowest level represented by relay 10L. Thus, when the tank is full, or at the top level to be telemetered, relay 1L is energized while relays 2L through 10L are deenergized. As the liquid level drops in the tank, additional relays are energized so that when the tank is half empty, for example, relays 1L through 5L will be in an energized condition. When the tank is at its lowest level, all relays 1L through 10L will be in an energized condition. Conversely, as the liquid level rises, the relays will be progressively deenergized in reversed order 10L through 1L. The rate of liquid output telemetering receiver R2 is connected to energize the coils of a plurality of rate of flow indicator relays 1F through 8F in a flow indicator system 13 (FIG. 1A) in the same fashion as relays 1L through 10L are connected to receiver R1; however, relays 1F through 8F are arranged to be progressively energized as the rate of flow increases from the lowest 1F to the highest 8F. Each of these level indicator relays and flow indicator relays operate one or more contacts to perform a variety of operations to thus actuate the computer, which operates to indicate certain ones of the plural pumps to be started and certain ones of said pumps to be stopped, the end result being a particular rate of liquid input to compensate for any existing conditions of level and rate of liquid output to maintain the liquid level in a predetermined steady state.

A group of eight relays SP1 through SP4 and ST1 through ST4 (FIG. 1A) are arranged to be actuated by actuating one of the individual pumps which are to be started or stopped. These relays are grouped in four pairs, each pair comprised of a stop relay and a start relay and each pair pertaining to a different pump as follows: stop relay SP1 and start relay ST1 serve as stop and start indicators, respectively, for example, a 1.5 million gallons per day pump; the second pair of stop and start relays SP2 and ST2 pertain to a 3 million gallons per day pump; the third pair of stop and start relays SP3 and ST3 pertain to a 4 million gallons per day pump; and the last pair of stop and start indicator relays SP4 and ST4 pertain to a 5 million gallons per day pump. The 1.5 million gallons per day pump and the 3 million gallons per day pump are selected as balance pumps and are arranged for alternate operation to maintain the water level constant when the level and flow rate are substantially normal.

Figure 1A:
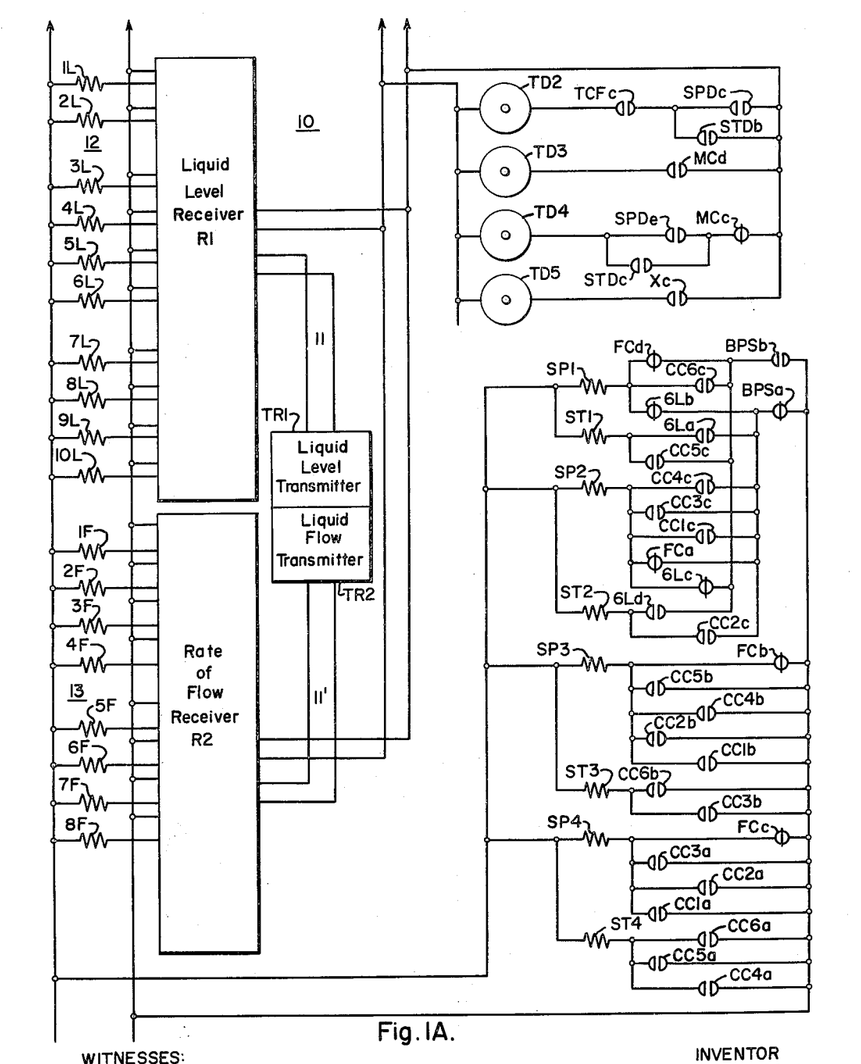
FIGS. 1A through 1C, when placed one below the other in that order, provide a schematic diagram of the telemetering means, the computer means and the supervisory control apparatus of the invention.

Under normal level conditions characterized by the energization of level indicator relays 5L or 6L and under conditions of relatively low rates of flow as characterized by the energization of flow relays 1F through 4F, the stop and start relays SP1 and ST1 of the 1.5 million gallons per day balance pump, are actuated to indicate a proposed operation of said pump to maintain the preselected desired water level as indicated by relay 6L. Energization of 6L thus closes its contact 6La to energize start relay ST1 through normally closed contacts BPSa. If the water level should rise as indicated by energization of relay 5L, deenergization of 6L occurs to open its contact 6La, and close normally closed contact 6Lb to energize stop indicator relay SP1 through contact BPSa. While stop indicator SP1 and start indicator ST1 are being operated as indicated, stop indicator relay SP2 of the 3 m.g.d. pump is held energized through normally closed contact BPSa and normally closed contact FCa. At the same time, start indicator relay ST2 cannot operate because of the open contact BPSb of the balance pump selector relay BPS as hereinafter discussed.

The alternate changing from one balance pump to the other is produced by the alternate energization and deenergization of the balance pump selector relay BPS, hereinafter discussed, which deenergizes to close its contact BPSa to condition relays ST1 and SP1 for operation by relay 6L in the manner hereinbefore discussed. Energization of the balance pump selector BPS also closes contact BPSb to condition relays ST2 and SP2 for operation by contacts 6Lc and 6Ld of relay 6L in the same fashion as contacts 6La and 6Lb are operated by 6L. Thus, when BPS is energized, the 3 m.g.d. balance pump is conditioned for operation. Conversely when BPS is deenergized, the 1.5 m.g.d. pump is conditioned for operation. It is seen that alternate energization and deenergization of balance pump selector relay BPS operates either one of two pumps of different pumping capacities.

The balance pump selector relay BPS is controlled by cooperative action among the rate of flow relays 5F, 6F and 7F, a step-down relay SD, and a step-up relay SU. The step-down relay SD and the step-up relay SU are controlled by the level indicator relays showing extremes of level. When the water level reaches such an extreme as to deenergize relay 3L, its normally closed contact 3La closes to energize step-down relay SD which locks itself in through its normally open contact SDa. Relay SD remains locked in until the water level drops to a low level to energize relay 8L which closes its contact 8La to shunt and thus deenergize step-down relay SD. Step-up relay SU is energized when the water level is low enough to energize relay 9L which closes its contact 9La. Step-up relay SU locks itself in through contact SUa until the water level rises to deenergize relay 4L, which then operates to close its contact 4La to shunt and thus deenergize step-up relay SU. Thus, it is seen that relay SU and relay SD are arranged for alternate energization by the water level indicator relays. The balance pump selector relay BPS is energized to condition the larger balance pump, that is the 3 million gallons per day pump, for operation when relay 5F energizes to close its contact 5Fa, and when relay SD deenergizes to close its contact SDb and when relay SU energizes to close its contact SUb. The balance pump selector relay BPS is also energized when flow indicator relay 6F energizes its contact 6Fa, when relay SD deenergizes to close its contact SDc, and when relay SU deenergizes to close its contact SUc. The third set of conditions for energizing relay BPS occurs when flow indicator relay 7F energizes to close its contact 7Fa when relay SU deenergizes to open its contact SUd and when relay SD energizes to close its contact SDd.

Under small variations in conditions of rate of flow, the balance pumps are able to maintain a predetermined tank level, however, when the rate of flow varies to such an extent that the balance pumps cannot maintain a prescribed level, as indicated by normal level indicator 6L, for example, a flow control relay FC is energized to condition the rate of flow indicators for controlling the selection of different pump combinations for proposed operation. As previously discussed, the indicator relays are progressively energized to a particular level. Therefore, energization of relay 6L, for example, includes energization of relays 1L through 5L as well, while relays 7L through 10L are in a deenergized condition. When the water level drops two increments from 6L, then relays 1L through 4L are energized while relays 5L through 10L are deenergized. The deenergization of relay 5L closes its contact 5La to energize flow control relay FC. Conversely, a rise in level energizes relay 7L which operates to close its contact 7La which also energizes relay FC. The energization of flow control relay FC closes its contact FCf to thus condition a pump combination selector system to determine the proper combination of pumps to be operated in accordance with the prevailing conditions of level and rate of flow.

The pump combination selector system (FIG. 1C) is comprised of a group of flow control relay contacts for energizing a group of pump combination relays through a group of calibration changer contacts. The flow control contacts are comprised of eight normally open contacts 1Fa, 2Fa, 3Fa, 4Fa, 5Fb, 6Fb, 7Fb, and 8Fa, each representing one of the eight rate of flow indicator relays, 1F through 8F, respectively. Each of the said contacts, except contact 8Fa, is arranged in series with a normally open contact of the next highest rate of flow indicator relay. Each of these pairs of series contacts energizes one of the pump combination relays CC1 through CC6 through contact FCf, through normally closed contact MCf of master control relay MC to be hereinafter discussed, and through the plural calibration contacts also to be hereinafter discussed. The group of series pairs of contacts are arranged to energize only one of the pump combination relays CC1 through CC6 at any one instant since the energization of any flow control indicator relay simultaneously closes a circuit to a particular pump combination relay and opens the circuit previously energized. For example, if the rate of flow is indicated by energization of flow indicator relay 1F, then its contact 1Fa closes to energize pump combination relay CC1 through closed contact 2Fb. If the rate of flow changes as indicated by the energization of relay 2F, then its contact 2Fa closes to energize pump combination relay CC2 through closed contact 3Fb. At the same time, contact 2Fb of the same relay 2F opens to deenergize relay CC1, thus leaving only relay CC2 energized even though both the rate of flow indicators 1F and 2F are in an energized condition. It is considered obvious without further explanation that as the flow indicators progressively energize from 1F through 8F or progressively deenergize from 8F through 1F, the remaining pairs of series contacts operate in the same fashion to energize or deenergize each one of relays CC1 to CC6 in turn. As will be explained hereinafter, each of the pump combination relays indicates a different combination of pumps to be operated to thus provide a variable pumping capacity. The above-described pump combination selector system provides for increasing the pumping capacity as the rate of flow increases and decreasing the pumping capacity as the rate of flow decreases.

The calibration changer contacts in the pump combination selector system hereinbefore mentioned are actuated by auxiliary step-down relay SDX, normal relay N and auxiliary step-up relay SUX to cause the particular flow control indicator relays to select different pump combination relays through the pump combination selector system under varying conditions. As hereinbefore discussed, a high water level causes energization of step-down relay SD while a low water level energizes step-up relay SU. When either of these relays are energized, their normally closed contacts SDe and SUe, respectively, operate to energize normal calibration relay N. When relay SD is energized it closes contact SDf to energize step-down calibration relay SDX. When relay SU is energized it closes contact SUf to energize step-up calibration relay SUX. As hereinbefore explained, relay SU and relay SD may not be simultaneously energized. Therefore, it follows that such an arrangement will permit energization of only one of the calibration relays SUX, N or SDX at any one time.

The energization of the normal calibration relay N closes all of its contacts Na through Nh to provide an energization path for each one of the pump combination relays CC1 through CC6 through the aforementioned series pairs of flow indicator contacts, except that contacts Na and Nb connect contacts 1Fa and 2Fa in parallel so that either one may energize relay CC1 and with the second exception that contacts Ng and Nh connect contacts 7Fb and 8Fa in parallel so that either one may energize relay CC6. Otherwise, contact Nc connects contact 3Fa to relay CC2, contact Nd connects 4Fa to relay CC3, contact Ne connects contact 5Fb to relay CC4, and contact Nf connects contact 6Fb to relay CC5. The energization of auxiliary step-up relay SUX operates to step-up the calibration by closing all of its contacts SUXa through SUXh wherein contact SUXa connects contact 1Fa to relay CC1, contact SUXb connects contact 2Fa to relay CC2, SUXc connects contact 3Fa to relay CC3, contact SUXd connects contact 4Fa to relay CC4, contact SUXe connects contact 5Fb to relay CC5, and each of contacts SUXf, SUXg, and SUXh connect contacts 6Fb, 7Fb, and 8Fa, respectively, in parallel so that each of them may energize a common relay CC6. It should be noted that such energization of step-up auxiliary relay SUX as outlined above connects each of contacts 2Fa through 6Fb to a pumping combination relay representing the next highest order of pumping capacity as compared with the pumping capacity which is selected by the energization of calibration relay N. Alternatively, when step-down calibration relay SDX is energized instead of relay N or relay SUX, contacts SDXa through SDXh are closed to step-down the calibration wherein contacts SDXa, SDXb and SDXc connect contacts 1Fa, 2Fa, 3Fa in parallel so that any one of them may energize pump combination relay CC1; contact SDXd connects contact 4Fa to relay CC2; contact SDXe connects contact 5Fb to relay CC3; contact SDXf connects contact 6Fb to relay CC4; contact SDXg connects contact 7Fb to CC5; and SDXh connects contact 8Fa to relay CC6. It should be noted that such energization of relay SDX connects each of said contacts 3Fa through 8Fa to a pumping combination relay of next lower capacity as compared to the pumping combination relays as selected by energization of the normal calibration relay N.

The pump combination relays CC1 through CC6 each represent a different combination of the three pumps which remain for operation when either one of the two balance pumps are operating in the manner hereinbefore discussed. The energization of any one of the relays CC1 through CC6 in turn serves to energize either the stop indicator relay or the start indicator relay of each of the pumps in a combination different from that of any of the others. These stop and start indicator relays indicate the operating status which each pump is to assume in accordance with the telemetered indications. The stop and start indicator relays for the 4 m.g.d. pump and the 5 m.g.d. pump are operated solely by the contacts of relays CC1 through CC6. The stop and start indicator relays have the 1.5 m.g.d. pump and the 3 m.g.d. pump, are at times operated by the contacts of relays CC1 through CC6 and at times between the level indicator 6L, depending upon the position of the balance pump selector relay BPS.

As hereinbefore discussed, an indication of a level less than 5L or greater than 7L serves to energize flow control relay FC to condition the pump selector relays CC1 through CC6 for energization by the flow control relays. In addition, the energization of flow control relay FC opens its contact FCb to deenergize stop indicator relay SP3 of the 4 m.g.d. pump and opens contact FCc to deenergize stop indicator relay SP4 of the 5 m.g.d. pump, this preparing the stop and start indicator relays of these pumps for control by the contacts CC1 through CC6.

The energization of pump combination relay CC1 closes contacts to energize the stop relays of the 3 m.g.d. pump, the 4 m.g.d. pump and the 5 m.g.d. pump as follows: contact CC1a closes to energize stop indicator relay SP4, contacts CC1b closes to energize stop indicator relay SP3; contacts CC1c closes to energize stop indicator relay SP2 when the balance pump selector contact BPSa closes. Neither the stop indicator relay SP1 or start indicator relay ST1 is controlled by relay CC1.

The energization of pump combination relay CC2 closes a group of contacts to energize the stop indicator relays of the 4 m.g.d. and 5 m.g.d. pumps and to energize the start indicator relay of the 3 m.g.d. pump as follows: contact CC2a closes to energize stop indicator relay SP4; contacts CC2b closes to energize stop indicator relay SP3; contact CC2c closes to energize stop indicator relay ST2 when the balance pump selector contact BPSa is closed. Neither the stop indicator relay SP1 nor the start indicator relay ST1 is controlled by relay CC2.

The energization of pump combination relay CC3 actuates a group of contacts to energize the stop indicator relays of the 5 m.g.d. pump and the 3 m.g.d. pump and to energize the start indicator relay of the 4 m.g.d. pump as follows: contact CC3a closes to energize relay SP4; contact CC3b closes to energize relay ST3; and contact CC3c closes to energize relay SP2 when balance pump selector contact BPSa is closed. Relay CC3 does not control either relay SP1 or relay ST1.

The energization of pump combination relay CC4 operates a group of contacts to energize the start indicator relay of the 5 m.g.d. pump, the stop indicator of the 4 m.g.d. pump, and the stop indicator relay of the 3 m.g.d. pump as follows: contact CC4a closes to energize relay ST4; contact CC4b closes to energize relay SP3; and contact CC4c closes to energize relay SP2 when the balance pumps electric contact BPSa are closed. Relay CC4 does not control either relay ST1 or relay SP1.

The energization of pump combination relay CC5 closes a group of contacts to energize the start indicator relay of the 5 m.g.d. pump, the stop indicator relay of the 4 m.g.d. pump, and the start indicator relay of the 1.5 m.g.d. pump as follows: contact CC5a closes to energize relay ST4; contact CC5b closes to energize relay SP3; contact CC5c closes to energize relay ST1 when the balance pumps electric contact BPSb is closed. Relay CC5 does not control either relay ST2 or relay SP2.

The energization of pump combination relay CC6 closes a group of contacts to energize the start indicator relay of the 5 m.g.d. pump, the start indicator relay of the 4 m.g.d. pump, and the stop indicator relay of the 1.5 m.g.d. pump as follows: contact CC6a closes to energize relay ST4; contact CC6b closes to energize relay ST3; contact CC6c closes to energize relay SP1 when balance pump selector contact BPSb is closed. Relay CC6 does not control either relay SP2 or relay SP1.

As will be explained more fully hereinafter, the proposed status of operation of the various pumps as indicated by the indicator relays are compared with actual status of operation indicators for each of the pumps. As a preliminary to the discussion of this comparator system, the supervisory control system for operating the pumps and indicating the actual status of operation of the respective pumps will now be described.

The supervisory control system (FIG. 1B) for controlling the various pumps and for indicating the actual status of operation of each of the pumps is substantially identical to the supervisory control system as disclosed in the Hans P. Boswau Patent No. 2,091,301, issued August 31, 1937, wherein is shown a selecting apparatus and circuit arrangement for switching the function of the selecting apparatus successively to select, check the selection, control and supervise a plurality of apparatus units. In applicant's device the apparatus units are the previously described plural pumps as submitted for the circuit breakers of Boswau. Other differences between the supervisory control apparatus and that of Boswau will be described in the ensuing discussion.

Figure 1B:
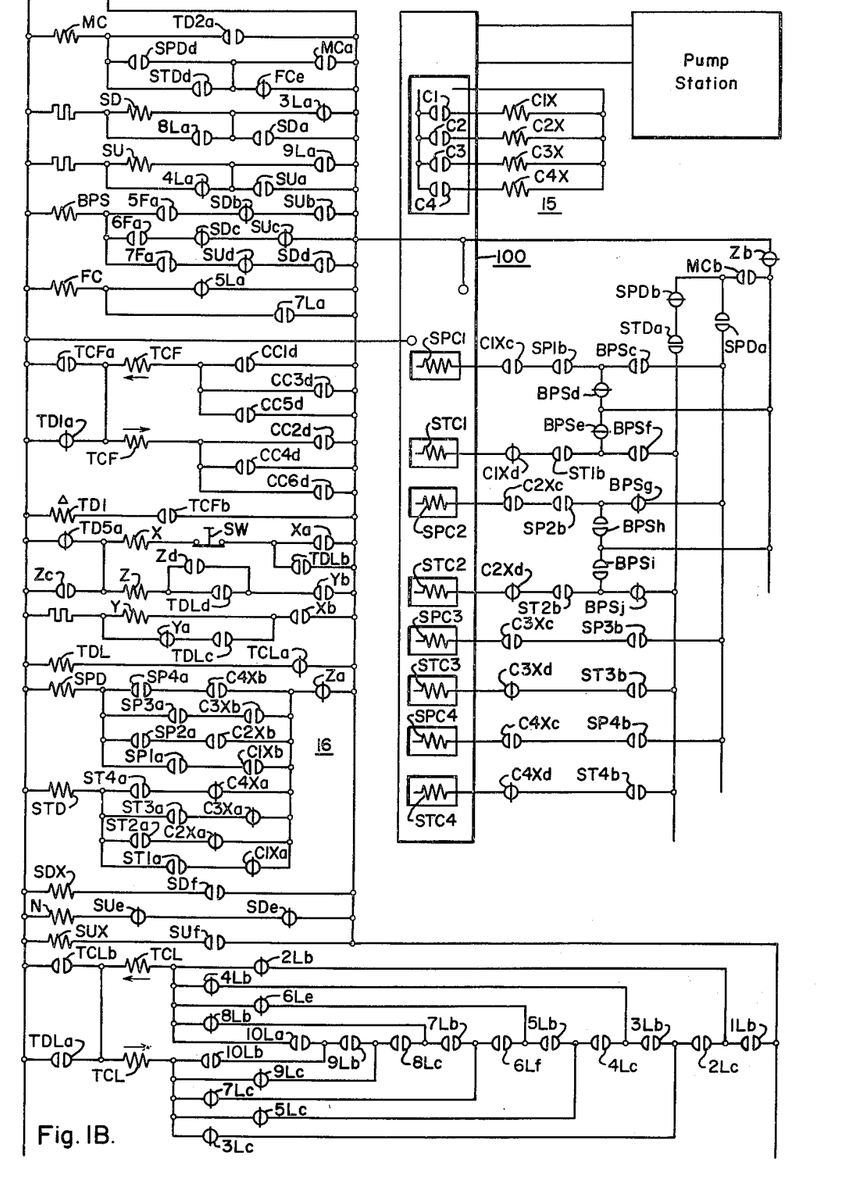
Figure 1C:
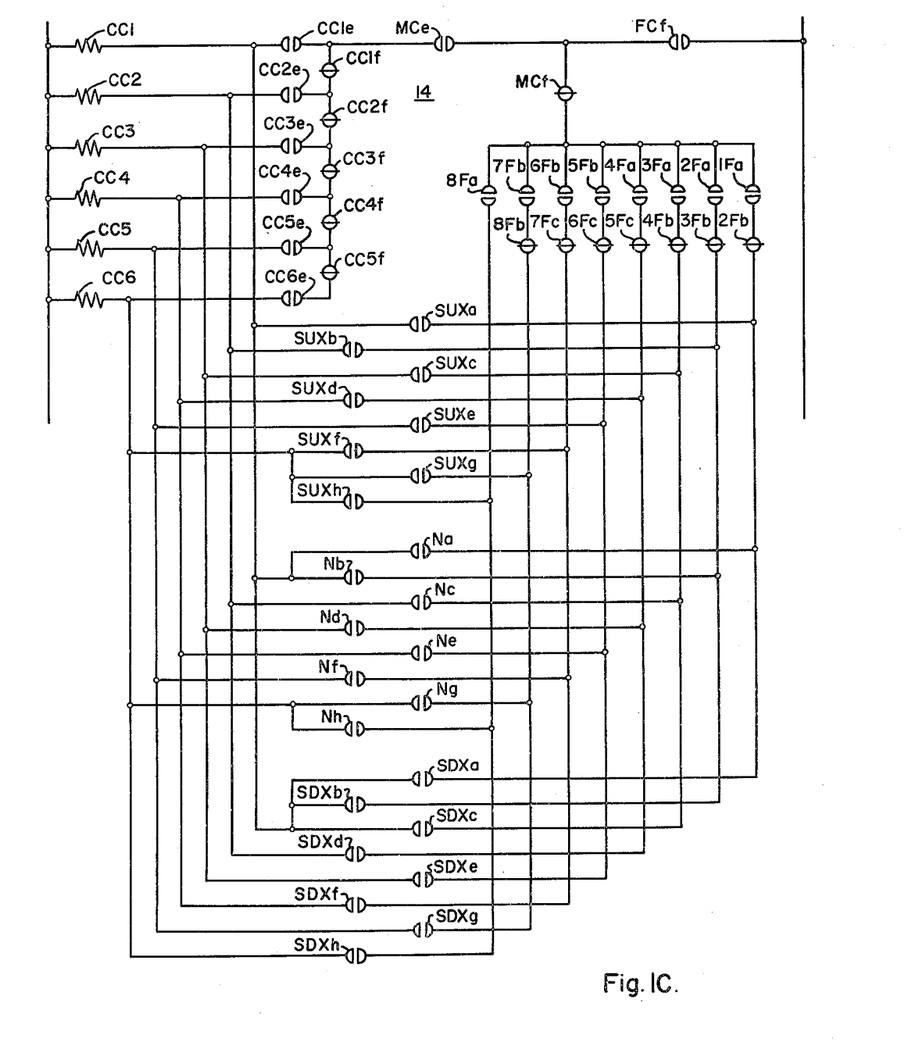
Figure 2A:
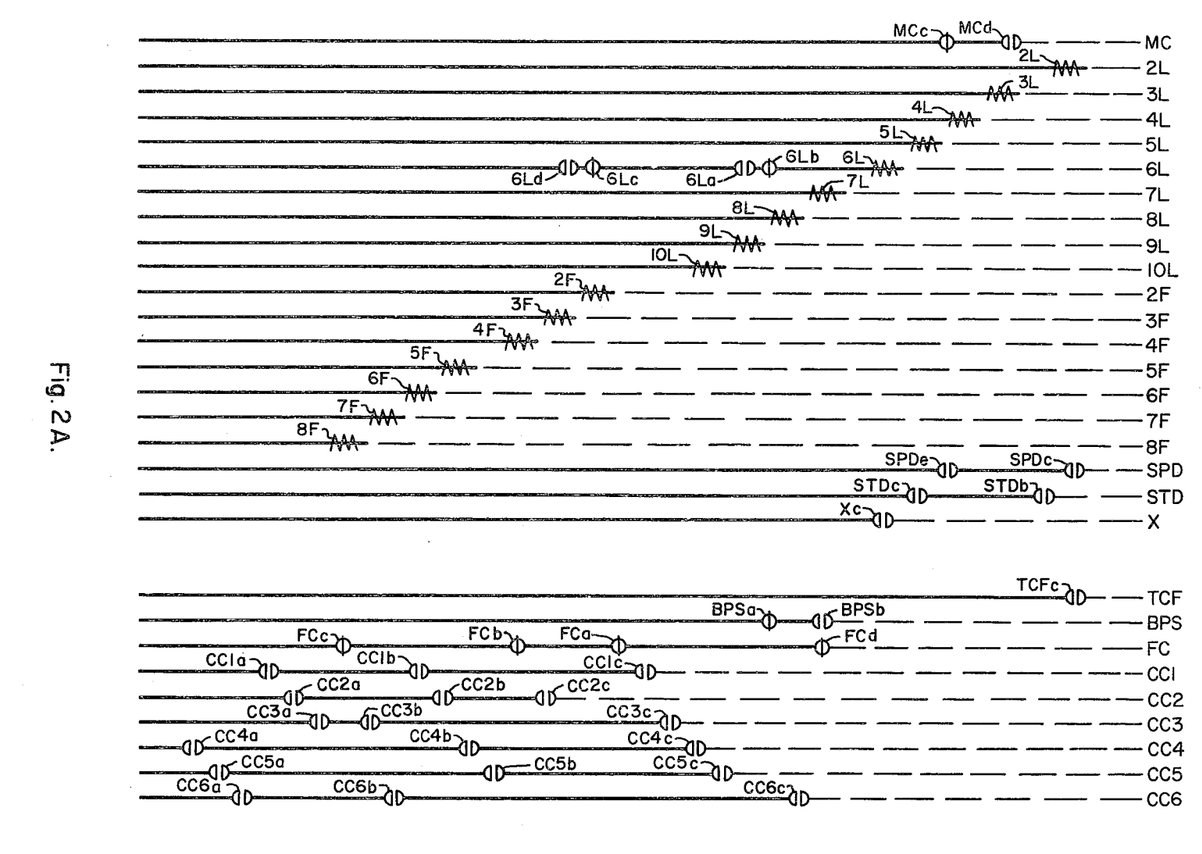
FIGS. 2A through 2C, when placed one below the other in that order, present a schematic representation of the characteristic ones of the relays shown in FIGS. 1A through 1C.
Figure 2B:
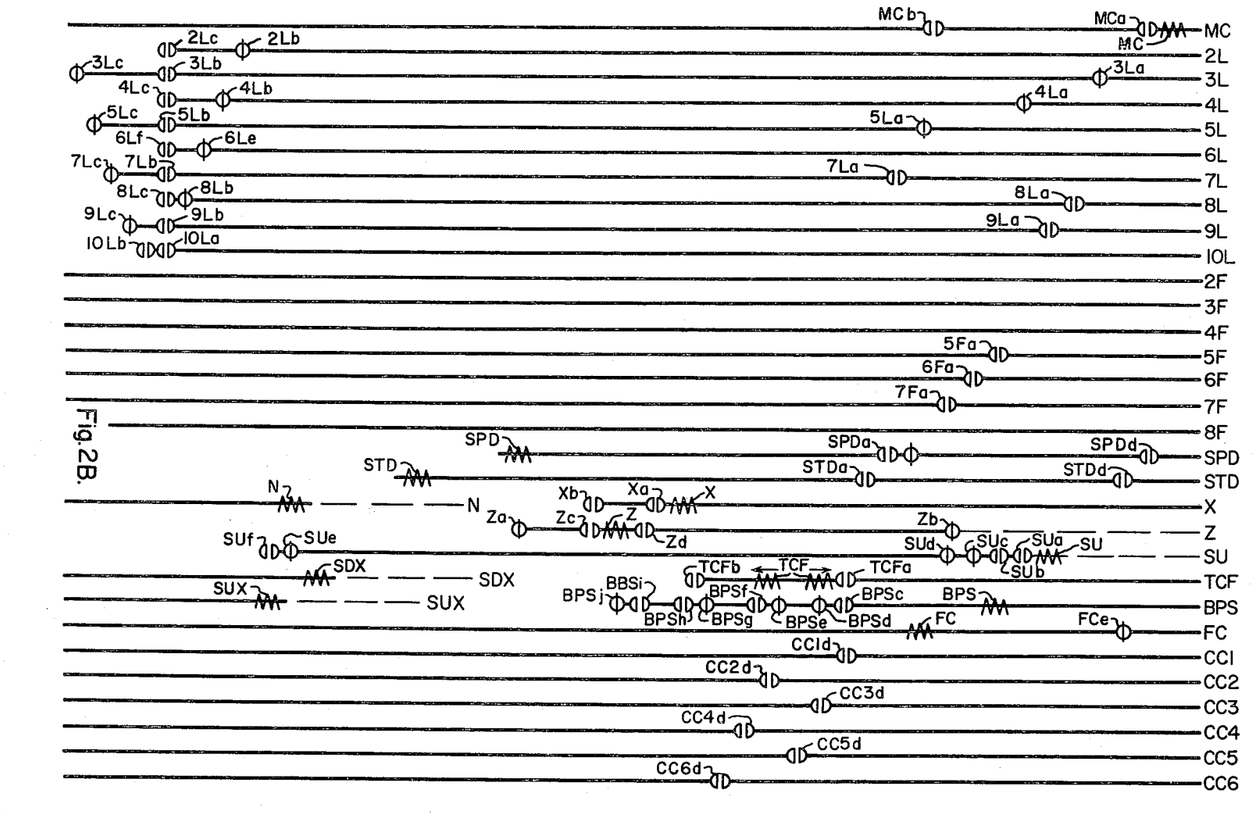
Figure 2C:
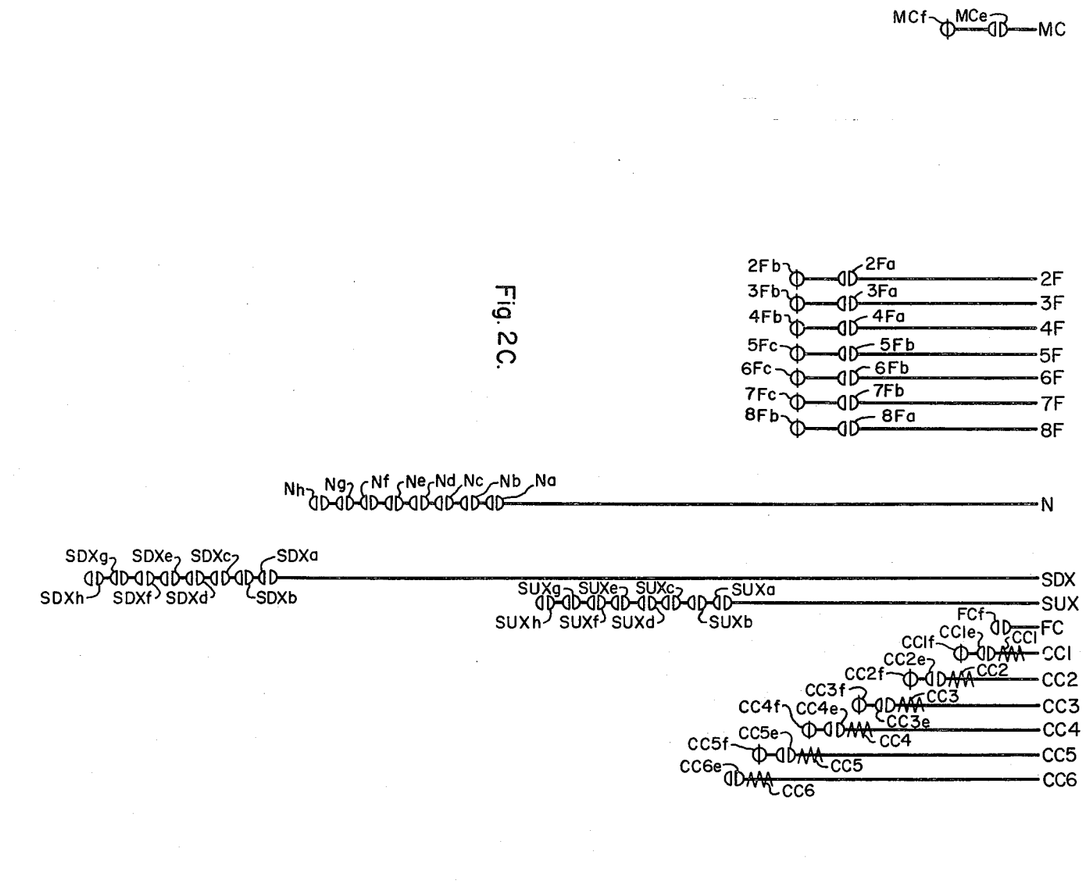

In the drawing, the elongated box 100 is representative of a casing for the supervisory apparatus at the control station as illustrated in FIGS. 1 and 2 of Boswau. The rectangular figures on the apparatus 100 represent openings in the casing for disclosing certain relays and controls which are added to or substituted for the Boswau apparatus, as will be explained. Each of the contacts C1 through C4 is an additional normally open contact for each one of the Boswau relays 128, 130 and two similar relays not shown for the other two points of Boswau. In Boswau, the energization of relay 128 closes a circuit to a red lamp to indicate an operating condition for the apparatus of that point. In the instant device, energization of relay 128 closes contact C1 to energize the status of operation indicator relay C1X, of the status of operation indicator system 15 (FIG. 1B) which represents the 1.5 m.g.d. pump. It should be noted that relay C1X will remain energized so long as and only so long as the 1.5 m.g.d. pump is in an operating condition. Relay C2X is in the status of operation indicator for the 3 m.g.d. pump; relay C3X is the status of operation indicator 4 m.g.d. pump; and relay C4X is the status of operation indicator for the 5 m.g.d. pump. Each of these status of operation indicator relays are energized only when their respective pumps are in an operating condition in the same manner as relay C1X is energized.

The other differences between Boswau supervisory control apparatus and the instant apparatus resides in the substitution of relay operated control contacts for the manually operated control contacts of Boswau. Start control relay STC4 is energised to close the Boswau contacts 125 and 126 of the point selection key 124 to provide a circuit for starting relay 216 of Boswau. At the same time, relay STC4 operates to actuate the Boswau contacts 121 and 122 of the control key 120 to provide for automatic operation of the control code starting relay 215 after the apparatus point is selected, and also determines the start code as performed by twist key 120. Boswau's start control relay STC4 also operates to close contact 101 of the Boswau master control key 102 to start the relay 215 when the selection code is received. Each of the start control relays STC1 through STC3, when energized, operates in a fashion identical to that of start control relay STC4 to perform the same type of control operations on their respective pumps.

Stop control relay SPC4 is energized to actuate the Boswau contacts 121 and 122 in the direction to provide for automatic operation of the control code stop relay after the apparatus point is selected and also to determine the stop code as performed by twist key 120 of Boswau. Stop control relay SPC4 also operates the point selection contact and the master control contacts in the same manner as does start control relay STC4. The stop control relay SPC1 through SPC3 operate in a fashion identical to SPC4 to control their respective pump apparatus points.

The start relay STC1 and stop relay SPC1 control the 1.5 m.g.d. pump; the 3 m.g.d. pump is controlled by start control relay STC2 and stop control relay SPC2; the 4 m.g.d. pump is controlling the start control relay STC3 and stop control relay SPC3; and the 5 m.g.d. pump is controlled by the start control relay STC4 and the stop control relay SPC4.

As hereinbefore mentioned, the determinations or selections of the calculator are compared with the status of operation indicators of the supervisory control apparatus to determine whether or not the pumping operations as requested by the calculator are actually in effect at the pumping station. A comparator system 16 (FIG. 1B) makes such a comparison and indicates a disagreement if the requested apparatus operations are not actually in effect. The comparator will now be described. Normally closed contacts C1Xa through C4Xa, as operated by the status of operation relays C1X through C4X, respectively, are connected in parallel to a start disagreement relay STD through normally closed contact Za. Each of said status of operation contacts is arranged in series with a normally open stop indication contact ST1a through ST4a, respectively. Thus, each of the pump indicator relays is in series with a status of operation relay of the same pump. For example, contact ST1a and contact C1Xa correspond to the 1.5 m.g.d. pump. The energization of start indicator relay ST1 by the calculator in the manner hereinbefore described closes contact ST1a in the comparator system. If the 1.5 m.g.d. pump is already operating, the status of operation indicator relay C1X is energized to open its contact C1Xa to hold the start disagreement relay STD in a deenergized condition. If the 1.5 m.g.d. pump is not operating, relay C1X is deenergized, thus closing its contact C1Xa and energizing stop disagreement relay STD to indicate a disagreement between the calculator termination and the actual status of operation of the pump. It is obvious that the remaining pairs of series contacts in the start disagreement system of the comparator system will operate the start disagreement relay STD when the same circumstances arise with respect to the other pumps.

The stop disagreement circuit of the comparator system for operating a stop disagreement relay SPD is the same as that of the start disagreement circuit except that the status of operation contacts C1Xb through C4Xb are normally open and except that each of these contacts is in series with a corresponding stop indicator contact SP1a through SP4a of each one of the pump indication relays SP1 through SP4, respectively. The energization of stop indicator relay SP1 for the 1.5 m.g.d. pump closes its contact SP1a. If the 1.5 m.g.d. pump is in an operating condition, then relay C1X is energized to close its contact C1Xb in the comparator system to thus energize the stop disagreement relay SPD. If the 1.5 m.g.d. pump is not in an operating condition, then the status of operation relay C1X is deenergized to open its contact C1Xb to thus permit the stop disagreement relay STD to remain in a deenergized condition. It is obvious that the remaining contacts in the stop disagreement circuit operate to actuate stop disagreement SPD in a like fashion.

An actuator system for the supervisory control apparatus is controlled by cooperative action among stop disagreement relay SPD, start disagreement relay STD, all of the start relays ST1 through ST4, all of the stop relays SP1 through SP4, and all of the status of operation indication relays C1X through C4X. The actuator system will now be described. Each one of a group of stop indicator contacts ST1b through SP4b are connected to one of the aforementioned stop control relays SPC1 through SPC4, respectively. Each of said contacts is paired in series with one of contacts C1Xc through C4Xc, respectively, and all of said series pairs are connected in common to a single normally open stop disagreement contact SPDa. When the stop disagreement relay SPD of the aforementioned comparator system is energized by any pair of stop indicating contact and status of operation indicator contact in the manner described above, then relay SPD closes its contact SPDa in the actuator to energize the appropriate stop control relays through a pair of stop indicator contacts and status of operation contacts which correspond to the stop indicator relay and status of operation relay which previously energized relay SPD in the comparator system. Thus, if stop indicator relay SP3 is energized to request that the 4 m.g.d. pump be stopped, and if status of operation relay C3X is energized to indicate that the 4 m.g.d. pump is in an operating condition, then contact SP3a and C3Xb of the comparator close to energize stop disagreement relay SPD which in turn closes its contact SPDa in the actuator. At the same time, contacts SP3b and C3Xc of the actuator close to energize stop control relay SPC3 which in turn energizes to stop the 4 m.g.d. pump. Also in the actuator, each of the start control relays STC1 through STC4 are connected to a start disagreement contact STDa through all of the start indicator contacts ST1b through ST4b paired with status of operation contacts C1Xd through C4Xd in the same manner to start the appropriate pumps as called for by the calculator, except that the contacts C1Xd through C4Xd are normally closed so that when a pump which is to be started is not in an operating condition, the start contacts ST1b through ST4b can energize the start control relays through the plural closed contacts C1Xd through C4Xd. The balance pump selector relay BPS, previously discussed, controls the actuator system to some degree. The energization of the balance pump selector relay BPS closes contacts BPSc, BPSf, BPSh, and BPSi. At the same time, energization of the relay BPS opens contacts BPSd, BPSe, BPSg, and BPSj. The foregoing operation of the balance pump selector contact thus conditions the control relays SPC1 and STC1 of the 1.5 m.g.d. pump for control through contacts STDa and SPDa while at the same time conditioning the control relays SPC2 and STC2 of the 3 m.g.d. pump and direct control by the balance pump selector relay. Deenergization of relay BPS reverses the condition for controlling the pumps in an obvious manner.

Also in the actuator, a normally open stop disagreement contact SPDb is provided in series with the start disagreement contact STDa so that in those situations where both the stop disagreement relay SPD and start disagreement relay STD, are energized, contact SPDb will open to prevent actuation of any of the start control relays STC1 through STC4 until all the stop functions before completing, thus providing orderly operation of the actuator in controlling the supervisory control apparatus.

A transient flow condition detection system is provided to delay operation of the pump control operations while a transient flow condition prevails, to thus prevent unnecessary operations of the various pumps. In the flow condition detector system, there is provided a transient flow condition relay TCF having twin wound coils connected in flux opposition as represented by the arrows in the drawing. One of the coils is connected for energization through any one of the pump combination selection contacts CC1d, CC3d, and CC5d. The other coil is connected for energization through any one of pump combination contacts CC2d, CC4d, and CC6d. Thus, it is seen that as the pump combination selector relays CC1 through CC6 are selectively energized because of changing flow conditions, the opposing coils of relay TCF are alternately energized. Conversely, a steady flow condition maintains relay TCF in a steady energized condition. Relay TCF is normally in a steady energized condition to hold its contact TCFa in a closed condition. Energization of relay TCF also holds closed the normally open contact TCFb to maintain slow-to-release relay TD1 normally energized which in turn holds open its contact TD1a. Therefore, when relay TCF drops out, because of a change in flow conditions, it will not pick up again until slow-to-release relays TD1 drops out.

Transient flow relay TCF cooperates with either one of stop disagreement relay SPD and start disagreement relay STD to control a timing motor TD2. Thus, transient flow contact TCFc cooperates with either one of contacts SPDc or STDb to operate the timing motor TD2. These connections permit operation of timing motor TD2 only when a steady flow condition exists and when either a stop disagreement or a start disagreement condition exists.

A master control relay MC is operated by timing motor contact TD2a to seal itself in through its contact MCa in cooperation with either stop disagreement contact SPDd or start disagreement contact STDd. Master control relay MC opens its contact MCc and closes its contact MCd in the pump combination selector system to thus prevent any change in the pump selection relays even though the flow conditions may vary while master control relay MC is energized. The aforementioned energization of the master control relay MC also closes a contact MCe in the actuator system to condition the actuator for operating the control relays in the supervisory control apparatus.

*Operation*

The general operation of the entire apparatus as hereinbefore described will now be discussed. It will be assumed that the level telemetering system has energized level indicator relays 1L through 6L thus indicating a normal level. It will also be assumed that the flow telemetering system has energized flow indication relays 1F through 5F thus indicating an average flow condition. Under these conditions either one of step-down relay SD or step-up relay SU may be operated depending on whether the previous extreme of water level was high or low, respectively. Assuming the previous extreme of water level to have been high, step-down relay SD is energized to close its contact SDf which energizes relays SDX to close the group of step-down calibration contacts SDXa through SDXh in the pump combination selector system. The balance pump selector relay BPS remains deenergized to thus permit energization of start relay ST1 of the 1.5 m.g.d. balance pump through normally closed contact BPSa and the now closed contact 6La. The flow control relay FC remains deenergized and thus its contact FCf in the pump combination selector system remains open to prevent energization of the pump combination relays CC1 through CC6 and to also render ineffective the step-down calibration as well. Stop indicator relay SP2 is energized through flow control contact FCa, stop indicator relay SP3 is energized through flow control contact FCb, and stop indicator relay SP4 is energized through flow control contact FCc.

The 1.5 m.g.d. pump is in an operating condition and accordingly the status of operation indicator relay C1X is energized. It will be assumed that the above-described conditions of normal water level and normal flow have been in operation for a period long enough to provide for the operation of the 1.5 m.g.d. Therefore the status of operation indicator relay C1X is in an energized condition. Accordingly, in the comparator system, status of operation contact C1Xa is open and stop indication contact SP1a is closed to thus retain the stop disagreement relay in a deenergized condition. Status of operation relays C2X through C4X are deenergized to indicate that their respective pumps are stopped. The actuator system for the control apparatus is at rest inasmuch as no new controls are being requested by the comparator.

It is now assumed that an increase in the rate of flow of water from the tank causes an energization of flow relays 1F through 7F, and which new rate of flow produces a drop in the level of the water in the tank to cause energization of level indicator relays 1L through 7L to indicate a lower water level. Under these new conditions of rate of flow and level the step-down relay SD and its auxiliary step-down relay SDX remain energized as above to actuate the step-down calibration contacts SDXa through SDXh. In addition, the new rate of flow as indicated by energization of flow indicator 7F closes contact 7Fa to cooperate with closed contacts SDd to energize the balance pump selector relay BPS. At the same time, the level indicator relay 7L closes its contact 7La to energize flow control relay FC to actuate the pump combination selector system, wherein pump combination relay CC5 is energized through closed contacts MCf, open contacts 7Fb, closed contact 8Fb and closed contact SDXg.

The energization of pump combination relay CC6 energizes start indicator relay ST4 through contact CC6a and also energizes start indicator relay ST3 through contact CC6b. The stop indicator relay SP4 and stop indicator relay SP3 are deenergized through contacts FCb and FCc which are now open because of the energization of the flow control relay FC. Stop indicator relay SP1 is energized through now closed balance pump selector contact BPSb and now closed pump combination contact CC6c. The start indicator relay ST1 is now deenergized through open contact BPSa and start indicator relay ST2 is now energized through closed contact 6Ld and closed contact BPSb. The foregoing operations call for the 3 m.g.d. pump, the 4 m.g.d. pump and the 5 m.g.d. pump to be started and calls for the 1.5 m.g.d. pump to be stopped, thus requesting an exact reverse condition of the prevailing pump operating conditions.

In the comparator system, the group of contacts ST2a through ST4a are closed by their respective start indicator relays while the group of contacts C2Xa through C4Xa are closed because of the deenergized condition of status of operation relays C2X through C4X. Thus, the start disagreement relay STD is energized through three of the four possible circuits thereto. Stop disagreement relay SPD is energized through contact SP1a and contact C1Xb.

Master control relay MC has operated to close its contact MCe in the actuator circuit because of the steady flow conditions and thus conditions the actuator for controlling the supervisory control apparatus. Stop disagreement contact SPDa closes to prepare the stop control relays for energization and at the same time contact SPDb opens to hold the start control relays deenergized until the stop controls are completed by the actuator. The stop control relay SPC1 is energized through contacts BPSc, SP1b and C1Xc. The supervisory control apparatus operates in the fashion clearly described in Boswau to stop the 1.5 m.g.d. pump, which stopped condition deenergizes status of operation relay C1X. The deenergization of relay C1X opens its contact C1Xc which deenergizes stop control relay SPC1. At the same time stop disagreement relay SPD is deenergized when contact C1Xb opens in the comparator circuit. The deenergization of stop disagreement relay SPD opens its contacts SPDa in the actuator circuit and closes its contact SPDb to prepare the start circuits of the actuator. Each of the start control relays STC2 through STC4 are energized simultaneously through their respective circuits. Start control relay STC2 is energized through contact BPSi of the balance pump selector relay BPS, through stop contact ST2b and through normally closed contact C2Xd. Start control relay STC3 is energized through contact ST3b and contact C3Xd; and start control contact STC4 is energized through contact ST4b and C4Xd.

The supervisory apparatus permits only one control operation to be performed at a time, as fully explained in the Boswau patent, so that the start control relays STC2 through STC4 will successively start the corresponding pumps and be successively deenergized by the status of operation relays C2L and C4L, respectively, until all the start operations are performed. Thereafter, stop disagreement relay STD deenergizes in the same manner as did stop disagreement relay SPD, the actuator and supervisory control apparatus come to rest, and the pumps are operating in the new pumping combination capacity in the manner as called for by the computer. The telemetering system meanwhile continuously transmits information to detect a change in conditions of level and rate of flow, which changed conditions may call for a new and different combination of pumps to provide a different rate of pumping.

Protection and alarm system

The combined computer and supervisory apparatus control system embodies certain alarm systems and protective systems not heretofore mentioned which will now be described. A timing motor TD4 is employed to indicate that a varying rate of flow has failed to reach steady condition and is thus prohibiting a control operation. Timing motor TD4 is energized through a master control contact MCc and through parallel contacts SPDe and STDc of stop disagreement relays SPD and start disagreement relays STD respectively. These contacts permit timing motor TD4 to time out to close a contact (not shown) in an annunciator (not shown) to sound an alarm. However, under normal conditions, a steady flow state will occur before timing motor TD4 times out and MCc will operate to open the circuit timing motor TD4.

Timing motor TD3 is employed to indicate that the equipment has failed to perform the prescribed control operations necessary to obtain a condition of agreement. Timing motor TD3 is energized by contact MCd of the relay MC, which is energized when a disagreement condition occurs and when the rate of flow is steady. Therefore, so long as the disagreement condition exists, master control relay MC is energized to permit timing motor TD3 to actuate an annunciator alarm or indicator (not shown). However, normally, an agreement condition is reached before timing motor TD3 can time out.

The protection system also includes means for indicating a faster than normal change in water level to thus call attention to either a broken water line or a failure in the telemetering system. A transient level condition detector relay TCL is arranged to drop out each time a change in water level is detected by the telemetering system. This relay is of the opposed flux double winding type as is relay TCF previously discussed as a part of the transient flow detecting system. The coils of relay TCL are connected to be alternately energized as the level changes to actuate different combinations of level indicator contacts which operate to provide obvious energizing circuits for the two coils. For example, energization of level indicator relay 1L energizes the one coil of relay TCL through normally open contacts 1Lb and through normally closed contact 2Lb. A change in level which energizes indicator relays 1L and 2L causes the energization of the other coil of relay TCL through normally open contacts 1Lb, 2Lc and normally closed contact 3Lc. The first coil of relay TCL is deenergized through normally closed contact 2Lb which is now open because of energization of relay 2L. When relay TCL drops out, it closes its contact TCLa to energize relay TDL which closes its contact TDLa to permit relay TCL to reenergize. Relay TDL also operates to close its contact TDLb to energize relay X which seals itself in through its contact Xa. The relay X also energizes relay Y through contact Xb as soon as relay TCL operates and releases relay TDL which opens its contact TDLc in the energization circuit for relay X. It is seen that relay Y cannot operate until relay TDL drops out because contact TDLc maintains relay Y in a shunted condition. Relay Y also operates to close its contact Yb to prepare a circuit for relay TDL to close its contact TDLd to energize relay Z upon the second time relay TDL operates. However, relay X energizes to close its contact Xc to energize timing motor TD5. During normal operation, timing motor TD5 to operate its contact TD5a to deenergize relay X before a second change in water level is selected, whereafter the deenergization of relay X deenergizes relay Y. However, if a second change in water level is detected, to thus energize relay TDL a second before timing motor TD5 operates, then relay Z will energize to lock itself in and relay X through contact Zc. The energization of relay Z opens its contact Zb leading to the actuator circuit for the supervisory control apparatus to thus prevent further control operations. Relay Z may also close a circuit to an annunciator (not shown) if desired. Switch SW is provided in the circuit of relay X to release relay Z and thereby reestablish the automatic control.

In the above-described apparatus, it is obvious that the number of level indicator relays and flow control indicator relays may be varied as desired to indicate different increments of measurement without departing from the spirit of this invention. Likewise the number of pumps and the respective pumping capacities thereof may be varied, if desired, to achieve a greater or lesser degree of tolerance in maintaining the tank level in any predetermined steady condition.

It is also obvious that the above-described computer and supervisory control apparatus could be connected to control plural valves or otherwise control the rate of fluid input of a gas rather than a liquid. Thus, the quantity of gas in the tank could be indicated by a pressure telemetering system rather than a level telemetering signal.

Since certain changes may be made in the above-described construction, and different embodiments of the invention may be made without departing from the spirit and scope thereof, it is intended that all matter contained in the above description and shown in the accompanying drawings, shall be considered illustrative and not in a limiting sense.

I claim as my invention:

1. In combination, means for indicating different conditions of liquid level and rate of liquid output from a tank; means controlled by said indicating means for selecting for proposed operation different combinations of different pumps for providing different rates of liquid input to maintain the liquid level in a predetermined steady condition; means for indicating the actual status of operation of each of the pumps; means for comparing the pump combination selections with the actual status of operation indicators; and means responsive to said comparing means, said pump combination selection means and said actual status of operation indicator means to control said pumps to eliminate any disagreement between said pump combination selection means and said actual status of operation indicator means.

2. In combination, a supervisory control apparatus for controlling a plurality of fluid input means to provide a variable fluid input to a tank having a variable fluid output, and including a status of operation indicator for each of said plurality of fluid input means; means for indicating different conditions of liquid level and rate of liquid output from the tank; computer means responsive to said indicator means for determining changes in operating status for one or more fluid input means to tend to maintain the fluid level in said tank in a predetermined steady condition; and means for automatically actuating the supervisory control apparatus to change the operating status of one or more of the fluid input means to produce agreement between the computer determinations and the status of operation indicators.

3. In combination, telemetering means for continuously monitoring variable conditions of liquid level and variable rate of liquid output of a remote tank; computer means actuated by said telemetering means and comprising means for selecting different combinations of a plurality of pumps for proposed operation to tend to maintain the liquid level in a predetermined steady state and means actuated by the selected means for indicating a proposed status of operation for each pump; supervisory control apparatus for operating each of the plurality of pumps, said apparatus comprising means for indicating the actual status of operation of each pump and actuator means, means for comparing the proposed status of operation indications with the actual status of operation indications, means for indicating a condition of disagreement between the compared indications, said actuator means controlled by the disagreement means and the proposed status of operation indicator means and the actual status of operation indicator means for actuating the supervisory control apparatus to change the status of operation of a pump or pumps to eliminate the disagreement condition.

4. In combination, computer means actuated by correlated indications of different levels of liquid and different rates of liquid output from a tank to select different combinations of a plurality of pumps for operation to tend to maintain the liquid level in a predetermined steady state; control means actuated by the computer to operate the pumps in accordance with the computer selections; and means preventing actuation of the control means until the rate of liquid output is constant.

5. In a computer: means for indicating a plurality of different values of the variable fluid level in a tank; means for indicating a plurality of different values of the variable rate of fluid output from the tank; means responsive to indications of a predetermined normal fluid level and indications within a prescribed range of rates of fluid output to select for alternate operation two pump means having different pumping capacities to tend to maintain the fluid level at the predetermined normal value as the rate of fluid output varies; and means responsive to indications of fluid levels other than said normal level to select for operation different ones or groups of pumps including said two pumps to tend to maintain the fluid level in said predetermined normal state.

6. In a computer; means for indicating a plurality of different values of the variable fluid level in a tank; means for indicating a plurality of different values of the variable rate of fluid output from the tank; means responsive to indications of a predetermined normal fluid level and indications within a prescribed range of rates of fluid output to select for alternate operation two pump means having different pumping capacities to tend to maintain the fluid level at the predetermined normal value as the rate of fluid output varies; and means responsive to indications of fluid levels other than said normal level and including means responsive to the fluid output indicating means to select for operation different ones or groups of pumps including said two pumps to tend to maintain the fluid level in said predetermined normal state.

7. In a computer; means for indicating different levels of a fluid in a tank; means for indicating different rates of fluid output from the tank; means responsive to both said indicating means to select different rates of fluid input from a predetermined input range to provide a variable fluid input to the tank to tend to maintain the liquid level in a predetermined steady state as the rate of output varies and including means responsive to an intermediate range of level indications to provide a normal calibration of said predetermined range of fluid input rates; and means responsive to indications of extreme levels to change the calibration of the range of fluid input rates.

References Cited in the file of this patent

UNITED STATES PATENTS

| | | |
|---|---|---|
| 1,346,898 | Kingsbury | July 20, 1920 |
| 1,962,676 | Albright | June 12, 1934 |
| 2,091,301 | Boswau | Aug. 31, 1937 |
| 2,486,256 | Buck | Oct. 25, 1949 |
| 2,503,213 | Philbrick | Apr. 4, 1950 |
| 2,570,451 | Hottenroth | Oct. 9, 1951 |
| 2,590,061 | Ash | Mar. 18, 1952 |
| 2,746,480 | Hildyard | May 22, 1956 |
| 2,797,702 | Martin | July 2, 1957 |